United States Patent [19]

Bogen

[11] 4,320,427
[45] Mar. 16, 1982

[54] WEAR-RESISTANT MAGNETIC HEADS

[76] Inventor: Wolfgang Bogen, Fischerhüttenstrasse 86a, 1000 Berlin 37, Fed. Rep. of Germany

[21] Appl. No.: 179,185

[22] Filed: Aug. 18, 1980

Related U.S. Application Data

[63] Continuation of Ser. No. 970,641, Dec. 18, 1978, abandoned.

[30] Foreign Application Priority Data

Dec. 20, 1977 [DE] Fed. Rep. of Germany ....... 2756834
Feb. 10, 1978 [DE] Fed. Rep. of Germany ....... 2805777

[51] Int. Cl.³ .......................... G11B 5/22; G11B 5/42; H01F 7/06
[52] U.S. Cl. ..................................... 360/122; 29/603; 360/125
[58] Field of Search ............... 360/122, 125, 126, 129, 360/119–121; 29/603; 204/192 EC, 192 M

[56] References Cited

U.S. PATENT DOCUMENTS

| | | | |
|---|---|---|---|
| 3,566,045 | 2/1971 | Paine et al. ........................ | 360/122 |
| 3,614,339 | 10/1971 | Schneider ........................... | 360/122 |
| 3,665,436 | 5/1972 | Murray et al. ..................... | 360/122 |
| 3,668,775 | 6/1972 | Morita et al. ...................... | 360/122 |
| 3,683,126 | 8/1972 | Krause .................................. | 360/122 |
| 3,781,834 | 12/1973 | Ginkel et al. ..................... | 360/129 |
| 3,928,908 | 12/1975 | Case .................................... | 360/122 |
| 3,999,216 | 12/1976 | Berchtold ........................... | 360/125 |
| 4,079,430 | 3/1978 | Fujishima et al. ................. | 360/126 |

FOREIGN PATENT DOCUMENTS 2362465 4/1978 France ............................... 360/122

OTHER PUBLICATIONS

IBM Tech., Disc. Bull., E. A. Bartkus et al., Wear Resistant and Contamination–Free Coating, vol. 17, No. 8, Jan. 1975, p. 2212.

IBM Tech., Disc. Bull., E. W. Smathers, Magnetic Head Fabrication, vol. 18, No. 12, May 1976, pp. 3910–3911.

Primary Examiner—Alfred H. Eddleman

[57] ABSTRACT

The present invention relates to a wear-resistant head and a method of producing same. Such a wear-resistant magnetic heads has at least one magnetic-core holder with at least one magnetic core embedded therein. At least that surface of the magnetic core or cores presentable to a recording carrier is composed of a metallic, magnetically-conducting substance deposited by a plasma coating process, or alternatively is of a magnetically non-conducting substance deposited by a plasma coating process, said substance completely surrounding the magnetic core.

14 Claims, 12 Drawing Figures

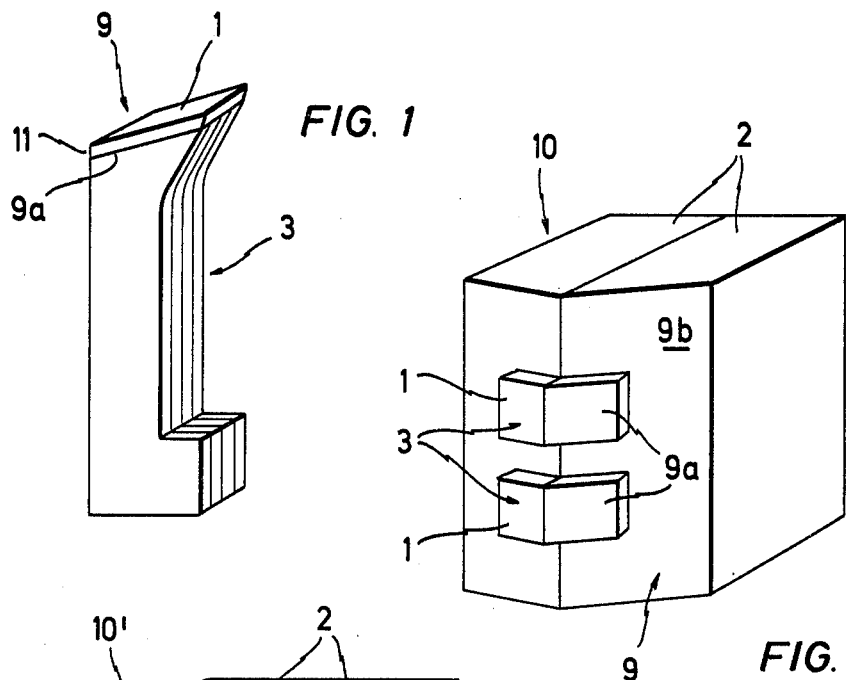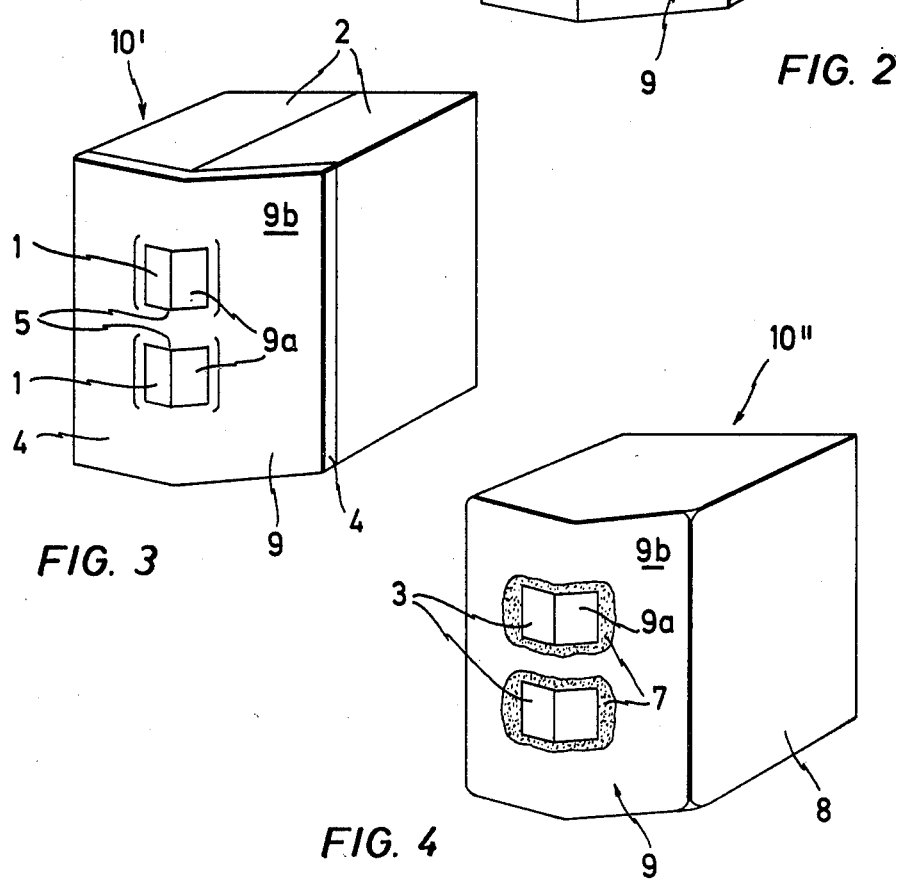

WEAR-RESISTANT MAGNETIC HEADS

This is a continuation of U.S. patent application Ser. No. 970,641, filed Dec. 18, 1978 and now abandoned.

This invention relates to a wear-resistant magnetic head particularly of the type having at least one core holder with at least one magnetic core embedded therein.

Such magnetic head are used for example in recording and play back systems where information is stored on magnetic carriers such as tape.

In the prior art means are known for enlarging the life of magnetic heads, for example by depositing thereon pole tips of Sendust, a ground Al-Fe-Si alloy. It is however difficult to produce small pole tips and to embed them in a mechanically stable condition because, for example owing to temperature fluctuations displacement can occur between the pole tips to alter the geometry of the gap, or undesirable shear cracks may occur between the pole tips and the magnetic cores. It has previously been attempted to combat these drawbacks by brazing the pole tips. Moreover, non-laminated pole tips incur eddy current losses, particularly if they are of manipulable, machinable masses and metallic material has been soldered into the core holders or magnetic head halves to stabilise the gap geometry, which materials can in turn become united in the gap area by the soldering.

Sendust magnetic heads with laminated magnetic cores moreover are liable, like all magnetic heads with laminated magnetic cores, to mutual displacement of the core laminates, particularly where there are temperature fluctuations, whereby the gap geometry is badly affected.

DT-OS Nos. 2,129,488 and 2,344,561 disclose wear-resistant magnetic heads which have a wear resistant covering layer, particularly of ceramic, which is applied by a plasma coating process. This layer is ground off during the finishing of the product until the gap and the magnetic core lie open in a narrow zone adjoining the gap.

The primary object of this invention is to provide a magnetic head of the type set forth above which is simple to manufacture, caters for optimum application of the recording carrier to the surface of the head with negligible damping due to the spacing between them, lengthens the life of the reproduction/recording apparatus and, in particular cases, is typified by a very high stability of the gap geometry particularly in the event of temperature fluctuations.

The present invention provides a wear-resistant magnetic head having at least one magnetic-core holder with at least one magnetic core embedded therein, and wherein at least that surface of the magnetic core or cores presentable to a recording carrier is composed of a metallic, magnetically-conducting substance deposited by a plasma coating process.

The present invention also provides a wear-resistant magnetic head having at least one magnetic-core holder with at least one magnetic core embedded therein in which the surface of the active face of the head presentable to a recording carrier is of a magnetically non-conducting substance deposited by a plasma coating process, said substance completely surrounding the magnetic core.

In a modification of the invention the magnetic core and/or the holder of the magnetic core is composed of at least one layer which extends in the longitudinal plane and is made by the plasma coating process. The layers may be alternately magnetically well-conducting and electrically badly-conducting to reduce eddy current losses.

A further object of the invention is to provide a process for manufacturing magnetic heads which be viable costwise and simple to carry out. To meet this object in accordance with the present invention the individual layers are separately densified and applied in sequence.

The manufacture of parts for preferred embodiments of magnetic heads is further described below.

Laminated cores, for example of mumetal, are stacked into magnetic cores and then the zone of the working face of the core covered by a plasma process with a layer of a preferably Sendust alloy or a magnetically-conducting material, for example an amorphous alloy, the layer being of about $250\mu$ to $350\mu$ thickness.

In the manufacture simultaneously of a plurality of magnetic cores the latter can be stacked in comb fashion with the interposition of retracted spacer plates. These spacer plates are about 0.2 to 0.3 m/m thick and—depending on the flow conditions of the plasma—set back about 0.3 to 0.5 m/m relatively to the outer edges of the magnetic core.

The layer material used is conveniently a Sendust alloy composed of 5% aluminium, 10% silicon, 85% iron, all by weight. The alloy is made from powdered basic materials by pressing blanks thereof, which are cintered in vacuum and have been finally pulverised to a suitable size.

To increase the hardness and reduce the brittleness of the layer, about 1 to 3% by weight of at least one element of the yttrium and the lanthanum group is added at the expense of the iron component.

The powdered basic material of the layer can also be applied directly from a plasma torch having a plurality of supply channels for the various materials to be mixed in the torch.

The metal powder is fed to the plasma torch with the help of a neutral gas; the grain size of the metallic powder may be between 5 and $20\mu$. In order to further improve the wear-resistant characteristic of the magnetic core layer, a small percentage of ceramic powder can be mixed with the metal powder.

To achieve improved adhesion of the layer to the cores the layer is built up of a number of sub-layers each of only about 10 to $15\mu$ thickness. After each sub-layer is applied the magnetic core is cooled by a blower, whereupon the next sub layer is applied. Since in plasma coating the metallic alloy can cool down very quickly on the cold magnetic cores, only a very limited number of crystals will form, and the advantages of amphorous alloys are exploited. Suitable for this purpose is, for example, mumetal which in the amphorous condition has a Vickers hardness of about 1000. Another alloy of about 45% iron, 50% nickel and 50% phosphorous, all parts by weight, has in the amphorous condition a Vickers hardness of 720.

It will be apparent that even one-piece magnetic cores can be given a plasma coating at their operative faces in the manner described above.

A described layer on the operative surface of a magnetic core not only extends the life of the same it also protects the individual laminations of the core against mutual separation, for example as a result of temperature fluctuation, and thus substantially improves the gap geometry of a magnetic head passing such a core.

After the gap defining surfaces of the magnetic core are lapped or ground in the usual way the halves or core holders of the magnetic head are brought together after cathodic metalising or incorporation of a gap material, for example by screwing. The magnetic cores project from the core holders in the vicinity of the head active surface by the thickness of the layer.

The active surface of the composite magnetic head can be covered with a continuous hard magnetically non-conducting layer by the plasma coating process, so that the previously projecting magnetic cores can be stably located in position. In this step of the procedure the layers of the magnetic cores can be covered with a mask. It is however more advantageous to grind away the magnetically non-conducting layer covering the layers on the cores without having to grind the active surface of the head.

A mixture of 40% titanium dioxide and 60% chromium oxide, both parts by weight, preferably applied by a plasma hard layering process is preferred as a magnetically non-conducting coating because it has electrically semiconducting properties. Electrostatic charging of the remaining parts of the active surface of the head or even of the magnetic cores which are embedded in core holders of insulating plastics material is thereby avoided. A metallic, likewise magnetically non-conducting coating with deposited hard metaloxide is however even more to be recommended on account of the improved adhesion to the base surface.

Since this non-conducting layer also is advantageously applied in a plurality of sub-layers with a cooling of each active surface of the head at each stage, core holders of plastics can be used. These are not only less expensive but they can also be moulded around and support the electrical terminals of the magnetic head.

In a modification of the invention so-called pole reflex surface corrections can be performed with the help of a magnetically well-conducting covering. For example in this case the contours of the magnetic core in the zone of the active surface of the head can be extended transversely to the direction of the gap to enable exceptionally long wave length to be better detected.

Since the rubbing or wear resistance of the magnetic head is very high, very small head active surface radii can be used with the advantage of an improved contact between the recording carrier and the magnetic head, thus providing an improved recording capability for short wavelengths and higher pulse intensities.

The improved magnetic heads can be used not only for cassette-type appliances, but quite generally over the magnetic recording field, for example as read-out heads for data processing.

The present invention is further described hereinafter, by way of example, with reference to the accompanying drawings, in which:

FIG. 1 is an embodiment of a magnetic core;

FIGS. 2 and 3 show stages in the construction of a composite magnetic head;

FIG. 4 is another example of a finished magnetic head;

Figure 5:
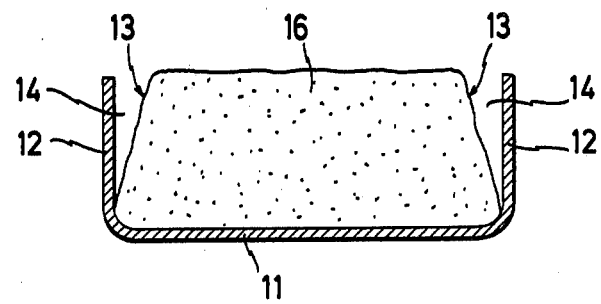
FIGS. 5 to 7 are in each case a cross section through channelled mould filled with a hard layering material.

FIG. 1 shows a laminated magnetic core 3 of a type suitable for use in a magnetic head according to the present invention. A layer 1 of good magnetically conducting material is formed on an upper surface 9d of the core 3 by a plasma coating process, the edge of the layer 1 being flush with the outer edge 11 of the surface 9d. The layer 1 in use contacts a recording carrier with its upper surface 9a.

FIG. 2 shows two cores 3 mounted in two magnetic core holders 2 to form an unfinished multiple magnetic head 10. The cores 3 are plasma coated with layers 1, the surface 9b of the core holders 2 being uncoated. A magnetically non-conducting layer 4 (FIG. 3) is then applied to the surface 9b of the core holders 2, the surface of the magnetic head 10' then being lapped or ground to reveal the pole faces 9a of the cores 3 but only sufficiently to provide a gap 5 between the two which gap 5 can be contacted by the recording carrier. The split between the two core holders 2 however remains coated to maintain the stability of the gap geometry. The finished magnetic head 10' is a twin-track head having as it does two cores 3 although it could equally be a one or multiple track head.

FIG. 4 illustrates a magnetic head 10" formed from the head 10 of FIG. 2 by covering the cores 3 of the head 10 with masks (not shown) which are larger than the faces 9a of the magnetic core 3. A coating or screening layer 8, of good magnetic conductivity, is then applied to the surface 9b of the holders 2 as screening. The masks are then removed from the magnetic cores 3 and the interspaces remaining between the magnetic cores 3 and the screening layer filled with a hard, magnetically non-conducting coating or a neutral layer 7. The magnetic head 10" is then ground or lapped in the usual way.

In the manufacture of complete magnetic cores made up of laminated core, magnetically good and electrically poor conductive layers alternate. The magnetically good conducting layers are for example used in a thickness of 10 to 15$\mu$ (microns) and the electrical poor conducting layers are used in a thickness of a few $\mu$ (microns).

Using masks to cover areas on which layering material is not to be deposited, the magnetic heads are made directly in the required dimensions in solid one-piece compact form. The magnetic cores may for example then be of the order of a millimeter thickness.

The forms, known as mould bodies, used for moulding the magnetic core material are so suited to the starting materials that the material which is to be compacted to form the magnetic core may be retained in the mould body, the latter then acting as magnetic core holders. Having regard to the eddy zones which are set up at the side walls of the mould body during the plasma coating, these mould bodies are made so that they open in funnel fashion towards the plasma torch.

The mould bodies may however constitute a pole tip holder or frame for a pair of pole tips, and here again the mould body and the starting materials used may be so adapted to one another that the starting material compacted in the mould body may remain in this body.

A non-magnetic bar, cut to shape, may for example be used as the mould body and can be cut into sections after the filling.

The mould bodies may be coated first of all with a magnetically well-conducting, amorphous plasma layer at least in part and only then the remainder of the mould body can be filled with a magnetizable material, preferably ferrite or alternatively layers with soft magnetic and electrically insulating properties can be applied in sequence.

The mould body illustrated in FIG. 5 is of U-shape in cross section and comprises a base 11 with two side walls 12 upstanding therefrom. A coating material 16 is introduced into the mould body using a plasma coating process so as to extend substantially perpendicular to the base 11. Because this will produce at the upright side walls 12 eddy zones 14 which will enlarge substantially in wedge fashion from the base 11, the core material 16 applied in this case assumes a trapezoidal form with side surfaces 13 which are inclined in the upwards direction.

Figure 6:
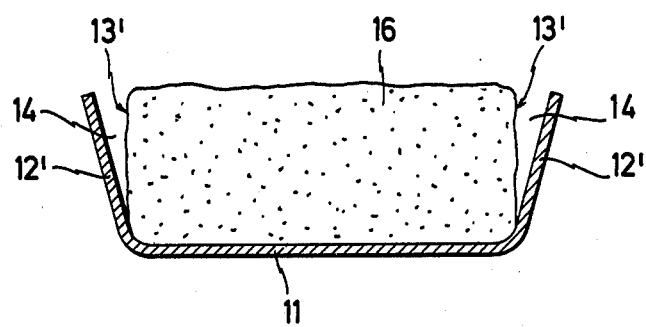

The mould body illustrated in FIG. 6 differs from that shown in FIG. 5 by the outward inclination of its side walls 12'. In this mould body the effect produced by the wedge shape at the zones 14 is exploited in that, because of the inclination of the side walls 12' the eddy zones likewise are amplified outwardly, the layer tips however remaining more or less stationary thereby producing a substantial quadrilateral deposition of the layering substance 16. This is shown by the side surfaces 13' of the deposited core material 16 which are seen to extend at right angles to the base 11 of the mould body.

Since the deposited layering material 16 adheres only to the base 11, there is the advantage that only the base 11 of the mould body has to be polished, for example to form the magnetic core and enable it to be detached from the mould body. Care has to be taken however to ensure that the thickness of the deposited core material 16 is sharply reduced in the eddy zones 14.

Figure 7:
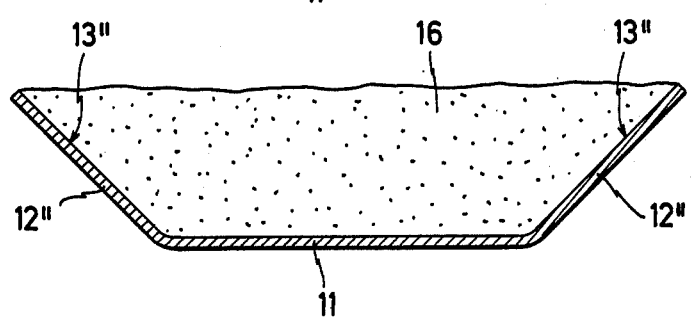

The cross section illustrated in FIG. 7 of a mould body which opens at an angle of 45° to the torch has the advantage that the side faces 13" of the deposited core material 16 adhere firmly to the side walls 12" of the mould body.

Figure 8:
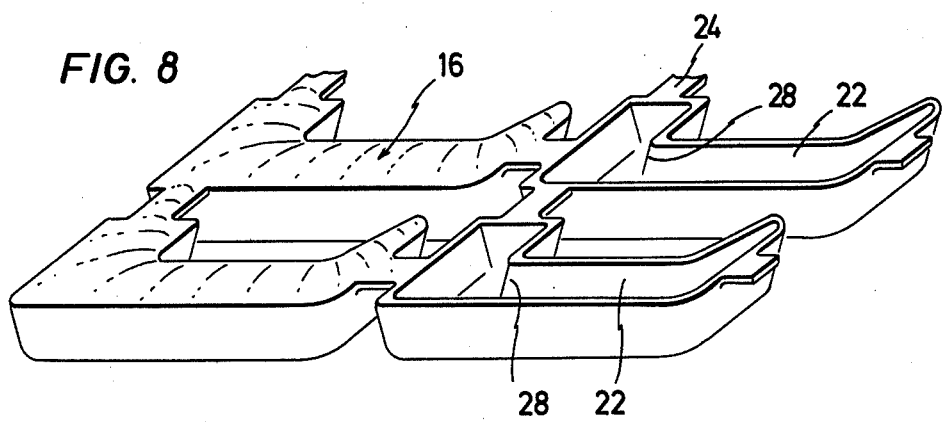
FIG. 8 is a view of a mould body of multiple form which has a thin laminate material palletted therein.

The mould body shown in FIG. 8 is composed of two moulds 22 which are individually of trough form and are attached to one another. The righthand part of FIG. 8 shows the individual mould 22 whilst it is still empty and the lefthand part of this figure shows the individual mould 22 which is filled with coating material 16. The mould body 22 is for example made from metal by means of a stamping or drawing process, this metal being thin enough to be removed later by lapping or grinding. The individual mould bodies, depending on the required size of magnetic core, may for example be about 1 mm high and 5 to 12 mm long.

After filling the individual moulds 22 with the material 16, the complete body is lapped in a two-disc lapping machine to a specific and predetermined thickness. The bottoms of the troughs and the lugs 24 are ground away to isolate the magnetic cores.

The method of manufacturing a pole piece as illustrated in stages in FIGS. 9 to 12 starts with a mould body 30 of bar form.

Figure 9:
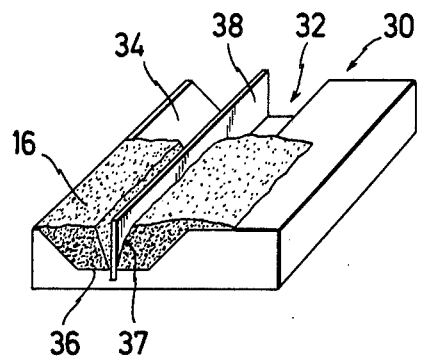
FIGS. 9 to 12 illustrate individual process steps for the manufacture of a pole piece using a bar-form mould body as known in the ferrite, magnetic-head technology.

The mould body 30 illustrated in FIG. 9 has a channelled recess 32 with side walls 34 flaring from the base 36 thereof towards the torch.

At approximately the centre of the channel-form recess 32 a support plate 38 is arranged substantially at right angles to the base 36. This plate 38 causes the setting up of an eddy zone so that the side faces 37 of the substance 16 deposited in layers facing the support plate 38 also open funnelwise towards the plasma torch.

Non-layered zones are produced at the two sides of the support plate 38. In FIG. 9 the channel-form recess 34 is filled with a Sendust layering or a magnetically well-conducting material of a density of the order of about 99%. The rearward section of the mould body 30 has not at this time been layered.

Figure 10:
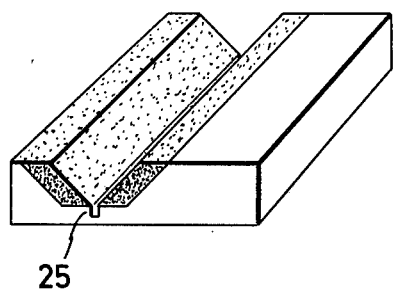

After the recess 32 has been filled the support plate 38 is removed and the mould body 30 machined as illustrated in FIG. 10.

Figure 11:
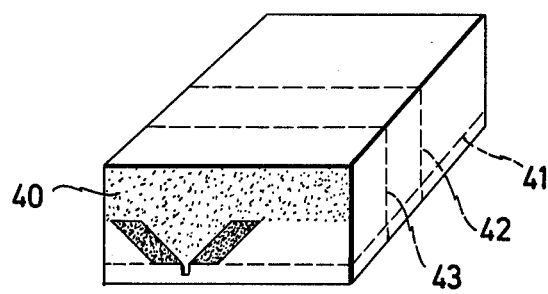

In FIG. 11 the remaining free space of the mould body, i.e. the space surrounded by the body is filled with a magnetically non-conducting material. This filling is again carried out using a plasma layering process. A smaller density is advantageous in order to avoid tensile forces being set up in this relatively thick filling layer 40. This lesser density is achieved by reducing the speed of injection.

The mould body 40 is cut up at the points indicated by the dotted lines 41, 42, 43 to produce the required pole pieces. After cathodic metallising or embedding a separated material the two halves of the pole piece are pressed together in a device until they are non separably united by filling a previously provided recess 50 behind the gap with magnetically non-conducting material of small density, again with the assistance of a plasma layering process.

Figure 12:
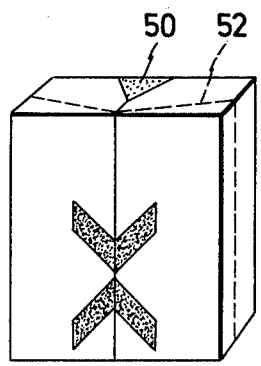

FIG. 12 illustrates the two-track pole piece which results. This has individual layers which are firmly adhered together, the principle of moulds which open at 45° to one another here being used. If layering is to be prevented, the operation is carried out using eddy zones.

Finally the pole piece illustrated in FIG. 12 must be machined along the dotted line 52. The rear side of the pole piece which is illustrated in FIG. 12 is then ground plane so that similarly plane ground magnetic cores will then result.

I claim:

1. A wear-resistant magnetic head adapted for positioning adjacent a recording carrier, including at least one magnetic core holder and having at least one magnetic core embedded therein, wherein the surfaces of the magnetic core and magnetic core holder are manufactured according to the steps of:
    (a) depositing by plasma coating process a metallic, magnetically-conducting first substance to a thickness of at least 0.25 mm over at least the surface of the magnetic core adapted to be adjacent to said recording carrier; and
    (b) depositing by plasma coating process a magnetically non-conducting second substance over the surface of said magnetic core holder adapted to be adjacent to said recording carrier to form a unitary surface surrounding said magnetic core surface.

2. A magnetic head according to claim 1 wherein said first substance is a Sendust alloy.

3. A magnet head as claimed in claim 2 wherein said Sendust alloy is substantially composed of 5% aluminum, 10% silicon and 85% iron, all percentages by weight.

4. A magnetic head as claimed in claim 1 wherein said first substance is substantially composed of 45% iron, 50% nickel and 5% phosphorous, all percentages by weight.

5. A magnetic head as claimed in claim 1, wherein the step of depositing said first substance further comprises depositing said substance over and beyond the outer edges of said magnetic core transversely to the direction of its head gap.

6. A magnetic head according to claim 1 wherein said second substance further comprises a neutral layer covering said magnetic core holder surface and directly adjoining said first substance.

7. A magnetic head according to claim 5 further comprising at least two magnetic cores and wherein said first substance fills the area between said two magnetic cores.

8. A magnetic head according to claim 1 wherein at least one of said first and second substances is deposited in successive sub-layers having thicknesses of 10–15 microns each.

9. A wear-resistant magnetic head adapted for positioning adjacent a recording carrier, including at least one magnetic core holder and at least one magnetic core embedded therein, wherein the magnetic core holder and magnetic core are constructed by the steps of:
(a) forming a longitudinal first layer of magnetically-conducting material by plasma deposition process, said layer having two halves separated by a gap;
(b) forming a longitudinal second layer of magnetically non-conducting material by plasma deposition process over said first layer and in said gap; and
(c) cutting said longitudinal layers into transverse sections.

10. A magnetic head according to claim 9, wherein each of said longitudinal layers further comprise a plurality of sub-layers having respective thicknesses of from 10–15 microns.

11. A magnetic head according to claim 9 wherein said longitudinal first layer further comprises sub-layers having respective thicknesses of less than 10 microns.

12. A magnetic head according to claim 9 wherein said longitudinal second layer further comprises sub-layers having respective thicknesses of less than 15 microns.

13. A magnetic head according to claim 9 wherein said longitudinal second layer further comprises a ceramic material.

14. A method of producing a wear-resistant magnetic head adapted for positioning adjacent a recording carrier, having at least one magnetic core holder with at least one magnetic core embedded therein, comprising the steps of:
(a) forming at least the surface of said magnetic core adapted to be adjacent said recording carrier by plasma deposition of a metallic, magnetically conducting first substance;
(b) forming the surface of said magnetic core holder adapted to be adjacent said recording carrier by plasma deposition of a magnetically non-conducting second substance, said second substance completely surrounding said magnetic core; and
(c) forming the magnetic core and magnetic core holder from a plurality of layers extending in longitudinal direction, wherein said respective first and second substances are deposited by a plasma coating process in a plurality of layers separately compacted and applied.

* * * * *